(12) United States Patent
Lesso et al.

(10) Patent No.: US 12,442,846 B2
(45) Date of Patent: Oct. 14, 2025

(54) CIRCUITRY FOR MEASUREMENT OF ELECTROCHEMICAL CELLS

(71) Applicant: Cirrus Logic International Semiconductor Ltd., Edinburgh (GB)

(72) Inventors: John P. Lesso, Edinburgh (GB); Salvatore Caporale, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 179 days.

(21) Appl. No.: 18/481,481

(22) Filed: Oct. 5, 2023

(65) Prior Publication Data

US 2025/0116691 A1 Apr. 10, 2025

(51) Int. Cl.
*G01N 33/543* (2006.01)
*G01N 27/327* (2006.01)
*G01R 27/16* (2006.01)

(52) U.S. Cl.
CPC ......... *G01R 27/16* (2013.01); *G01N 27/3273* (2013.01); *G01N 27/3274* (2013.01); *G01N 33/5438* (2013.01)

(58) Field of Classification Search
CPC ........... G01N 33/5438; G01N 27/3273; G01N 27/3274
USPC ........................................ 324/525, 600, 649
See application file for complete search history.

(56) References Cited

U.S. PATENT DOCUMENTS

2011/0259741 A1* 10/2011 Murase .............. A61B 5/14865
                                                            204/403.01
2023/0384260 A1* 11/2023 Verhelst ............... G01N 27/416

FOREIGN PATENT DOCUMENTS

WO    2013176773 A1    11/2013
WO    2021232091 A1    11/2021

OTHER PUBLICATIONS

International Search Report and Written Opinion of the International Searching Authority, International Application No. PCT/GB2024/052235, mailed Dec. 17, 2024.

* cited by examiner

*Primary Examiner* — Roberto Velez
(74) *Attorney, Agent, or Firm* — Jackson Walker L.L.P.

(57) ABSTRACT

Circuitry for determining one or more characteristics of an electrochemical cell comprising a first working electrode, a second working electrode and a counter electrode, the circuitry comprising: drive circuitry configured to: apply a first stimulus to the first working electrode; apply a compensation stimulus to one or more of the first working electrode, the second working electrode and the counter electrode; measurement circuitry configured to: measure a first signal at the first working electrode; and measure a second signal at the second working electrode; and processing circuitry configured to: determine the one or more characteristics of the electrochemical cell based on the first signal or the second signal, wherein the compensation stimulus is applied to compensate for cross talk between the first working electrode and the second working electrode.

21 Claims, 11 Drawing Sheets

| WE | VRE known? | ZC known? | Inputs | Algorithm(s) |
|---|---|---|---|---|
| 1 | N | Y | IWE1, ZCE | Analytical |
| | | N | IWE1 for VWE1 | LMS filter |
| | Y | Y | VRE, ZCE | Analytical |
| | | N | IWE1, VRE | Analytical |
| 2 | N | Y | IWE1, WE2, ZCE | Non-linear opt., LMS Filter |
| | | N | IW11, IW21, IW21, IW22, IC1, IC2 | Pseudoinverse, Analytical, Non-linear opt. |
| | | | IWE1, IWE2 for VWE2 | LMS filter, Non-linear opt. |
| | Y | Y | VRE, ZCE, (IWE1 or IWE2) | Analytical |
| | | N | IWE1, IWE2, VRE | Analytical |
| | | | IWE1, VRE for VWE2 | LMS filter, Non-linear opt. |

Fig. 14

CIRCUITRY FOR MEASUREMENT OF ELECTROCHEMICAL CELLS

TECHNICAL FIELD

The present disclosure relates to circuitry for measuring characteristics in electrochemical cells.

BACKGROUND

Electrochemical sensors are widely used for the detection or characterisation of one or more particular chemical species, analytes, as an oxidation or reduction current. Such sensors comprise an electrochemical cell, consisting of two or more electrodes configured for contact with an analyte whose concentration is to be ascertained. Such sensors also comprise circuitry for driving one or more of the electrodes and for measuring a response signal at one or more of the electrodes. The measured response signal can be processed to determine a concentration of an analyte.

For some applications, it may be desirable to measure multiple analytes using a single sensor. To do so, an electrochemical cell may be provided with multiple working electrodes, each configured to measure a respective analyte.

Error can be introduced in the measured response(s) due to non-ideal effects at the electrochemical cell as well as sub-optimal conditions in circuitry used to measure the response. For instance, where two working electrodes are provided, crosstalk may occur between working electrodes which may in turn affect measured responses.

SUMMARY

According to a first aspect of the disclosure, there is provided circuitry for determining one or more characteristics of an electrochemical cell comprising a first working electrode, a second working electrode and a counter electrode, the circuitry comprising: drive circuitry configured to: apply a first stimulus to the first working electrode; apply the a compensation stimulus to one or more of the first working electrode, the second working electrode and the counter electrode; measurement circuitry configured to: measure a first signal at the first working electrode; and measure a second signal at the second working electrode; and processing circuitry configured to: determine the one or more characteristics of the electrochemical cell based on the first signal or the second signal, wherein the compensation stimulus is applied to compensate for cross talk between the first working electrode and the second working electrode.

The compensation stimulus may comprise a step signal, an impulse signal, or a sine wave, or a chirp.

The compensation stimulus may comprise: a first compensation component applied at the first working electrode; and a second compensation component applied at the second working electrode.

The processing circuitry may be configured to: determine the compensation stimulus. The compensation stimulus may be determined in dependence on a counter electrode impedance of the counter electrode.

Determining the compensation stimulus may comprise: obtaining an estimate of the counter electrode impedance of the counter electrode; and determining the compensation stimulus based on the estimated counter electrode impedance.

The processing circuitry may be configured to: determine one or more characteristics of the electrochemical cell based on the estimate of the first counter electrode impedance.

Obtaining an estimate of the counter electrode impedance may comprise: applying a stimulus at one of the counter electrode, the first working electrode, and the second working electrode; and measuring a first working electrode current at the first working electrode and/or a second working electrode current at the second working electrode; and determining the counter electrode impedance based on the first and/or second working electrode currents.

Obtaining an estimate of the counter electrode impedance may further comprise measuring a reference electrode current at a reference electrode of the electrochemical cell. The counter electrode impedance may be determined based on the reference electrode current.

The processing circuitry may be configured to obtain an estimate of a first working electrode impedance of the first working electrode and/or an estimate of a second working electrode impedance of the second working electrode based on the measured first working electrode current and/or the second working electrode current.

The processing circuitry may be configured to determine one or more characteristics of the electrochemical cell based on the estimate of the first working electrode impedance and/or the estimate of the second working electrode impedance.

The estimate of the counter electrode impedance may be obtained using one or more of the following methods: a) circuit analysis to obtain or fit one or more formulae for the estimate of the counter electrode impedance; b) numerical optimisation; c) least mean squared estimation; d) performing an inverse of first and second working electrode impedances of the first and second working electrodes.

The processing circuitry may be configured to determine, based on the one or more characteristics, one or more of the following: a) an optimum bias voltage to be applied to the electrochemical cell during sensing of an analyte; b) a quality of an electrolyte or electrode in the electrochemical cell; c) a fault at the electrochemical cell; d) a condition of the electrochemical cell; d) determine one or more offsets for subsequent processing; e) updating an equivalent circuit model (ECM) for the electrochemical cell.

The measurement circuitry may be configured to: convert the first signal at the first working electrode to a first analog output signal; and convert the second signal at the first working electrode to a second analog output signal.

The measurement circuitry may comprise one or more analog-to-digital converters (ADCs) configured to convert the first analog output signal to a first digital output signal and convert the second analog output signal to a second digital output signal.

The measurement circuitry may comprise: a multiplexer having: a first input for receiving the first analog output signal; a second input for receiving the second analog output signal; and a multiplexer output for outputting the first analog output signal or the second analog output signal in response to a select signal; and an analog-to-digital converter (ADC) having a first ADC input coupled to the multiplexer output, the ADC configured to convert the first analog output signal or the second analog output signal to a digital output signal.

The measurement circuitry may be configured to measure a third signal at a reference electrode of the electrochemical cell. The processing circuitry may be configured to determine the one or more characteristics of the electrochemical cell based on the third signal.

The electrochemical cell may comprise one of an amperometric sensor and a potentiometric sensor.

It will be appreciated that the processing circuitry may be incorporated into a single device or distributed over multiple devices. For example, the processing circuitry may be provided on the same device as the measurement and drive circuitry. Additionally or alternatively, the processing circuitry may be provided in another device remote from the drive and measurement circuitry. Such a remote device may be a computer or smartphone or the like.

According to another aspect of the disclosure, there is provided a system comprising the circuitry described above, and the electrochemical cell.

According to another aspect of the disclosure, there is provided an electronic device, comprising the circuitry or system described above.

The electronic device may comprise one of an analyte monitoring device or an analyte sensing device, a continuous glucose monitor, a battery, a battery monitoring device, a mobile computing device, a laptop computer, a tablet computer, a games console, a remote control device, a home automation controller or a domestic appliance, a toy, a robot, an audio player, a video player, or a mobile telephone, and a smartphone.

According to another aspect of the disclosure, there is provided a method of determining one or more characteristics of an electrochemical cell comprising a first working electrode, a second working electrode and a counter electrode, the method comprising: applying a first stimulus to the first working electrode; applying the compensation stimulus to one or more of the first working electrode, the second working electrode and the counter electrode; measuring a first signal at the first working electrode; and measuring a second signal at the second working electrode, determining the one or more characteristics of the electrochemical cell based on the first signal or the second signal, wherein the compensation stimulus is applied to compensate for cross talk between the first working electrode and the second working electrode.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which:

FIG. 14 is a table showing various options for determining impedance values for the electrochemical cell of FIG. 3.

DESCRIPTION OF EMBODIMENTS

Electrochemical sensors are widely used for the detection of one or more particular chemical species, analytes, as an oxidation or reduction current. Such sensors comprise an electrochemical cell, consisting of two or more electrodes configured for contact with an analyte whose concentration is to be ascertained. Such sensors also comprise circuitry for driving one or more of the electrodes and for measuring a response at one or more of the electrodes. Batteries also comprise one or more electrochemical cells which typically consist of two or more electrodes (e.g., an anode and a cathode) configured for contact with a conductive electrolyte. Characteristics of batteries may be ascertained using drive and measurement circuitry similar to that used for characterising electrochemical cells in electrochemical sensors.

Embodiments of the present disclosure provide various novel drive and measurement regimes for characterising electrochemical cells and systems (such as sensors, batteries and the like) into which electrochemical cells are incorporated.

Various implementation details pertaining to drive and measurement circuitry for obtaining characterising impedance measurements of an electrochemical cell are described below. Such embodiments focus primarily on electrochemical cells comprised in sensors (e.g. potentiostats). For example, the embodiments described herein may be implemented as part of an analyte monitoring system, such as a continuous glucose monitor (CGM). It will be appreciated, however, that embodiments are not limited to use with electrochemical sensors. For example, batteries also comprise one or more electrochemical cells which typically consist of two or more electrodes (e.g., an anode and a cathode) configured for contact with a conductive electrolyte. Impedance characteristics of batteries (e.g. comprising lithium ion or silver oxide cell(s)) may be ascertained using drive and measurement circuitry described herein. For example, embodiments of the present disclosure may be implemented as part of battery monitoring device (e.g. to monitor the status and/or health of a battery).

Figure 1:
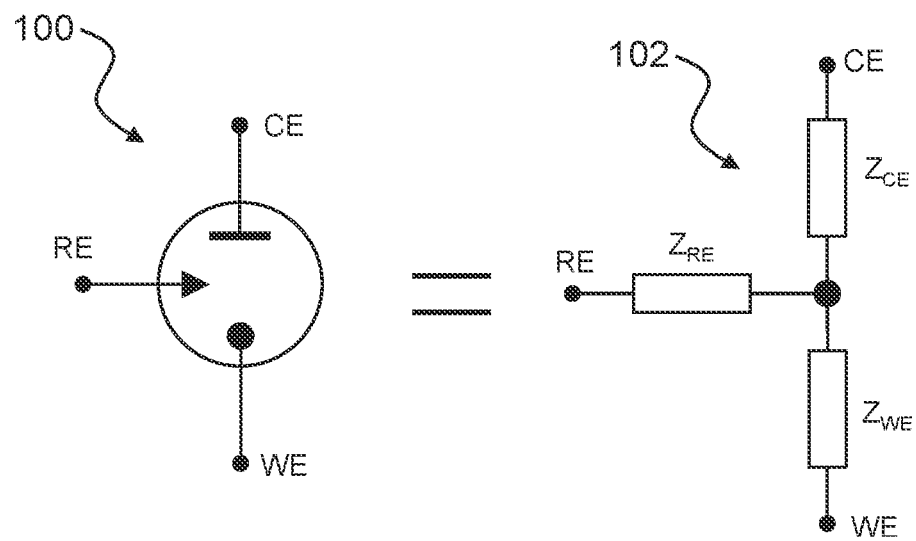
FIG. 1 illustrates a schematic diagram and electrical equivalent circuit for a three-electrode electrochemical cell.

FIG. 1 is a schematic diagram of an electrochemical cell 100 comprising three electrodes, namely a counter electrode CE, a working electrode WE and a reference electrode RE. FIG. 1 also shows an equivalent circuit 102 for the electrochemical cell comprising a counter electrode impedance ZCE, a working electrode impedance ZWE and a reference electrode impedance ZRE.

Figure 2:
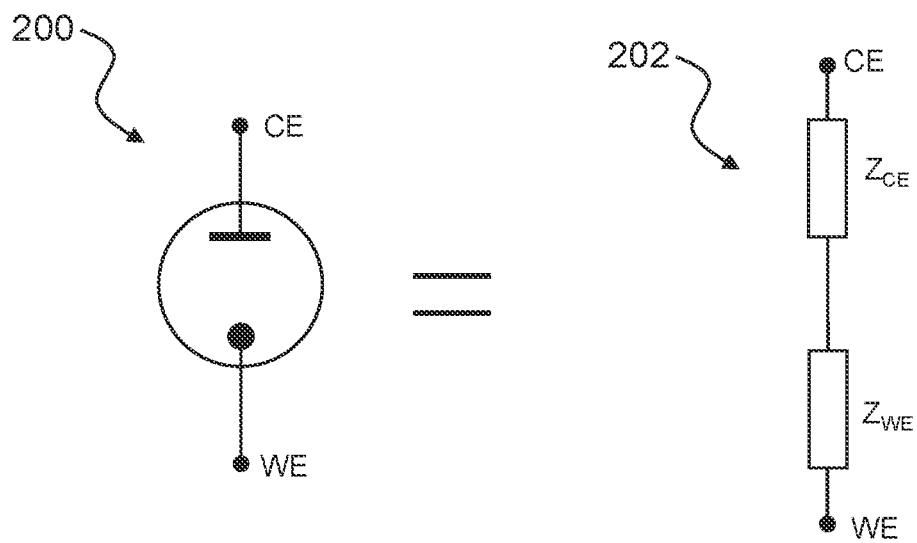
FIG. 2 illustrates a schematic diagram and electrical equivalent circuit for a two-electrode electrochemical cell.

FIG. 2 is a schematic diagram of another example electrochemical cell 200 comprising two electrodes, namely a counter electrode CE and a working electrode WE. The electrochemical cell 200 varies for the cell 100 with the omission of the reference electrode RE. FIG. 2 also shows an equivalent circuit 102 for the electrochemical cell 200 comprising a counter electrode impedance ZCE and a working electrode impedance ZWE.

In some embodiments, the working electrode WE comprises an assay or chemical of interest. For example for the analysis of glucose as an analyte, the working electrode may comprise a layer of glucose oxidase. The counter electrode CE is provided to form an electrical or ohmic connection with the working electrode WE. Optionally, the reference electrode is provided, which is typically a sensing point between the working electrode WE and the counter electrode CE, allowing independent measurement of the potential associated with each of the working and counter electrodes WE. CE, rather than just measuring a potential difference between the counter and working electrodes CE, WE.

Figure 3:
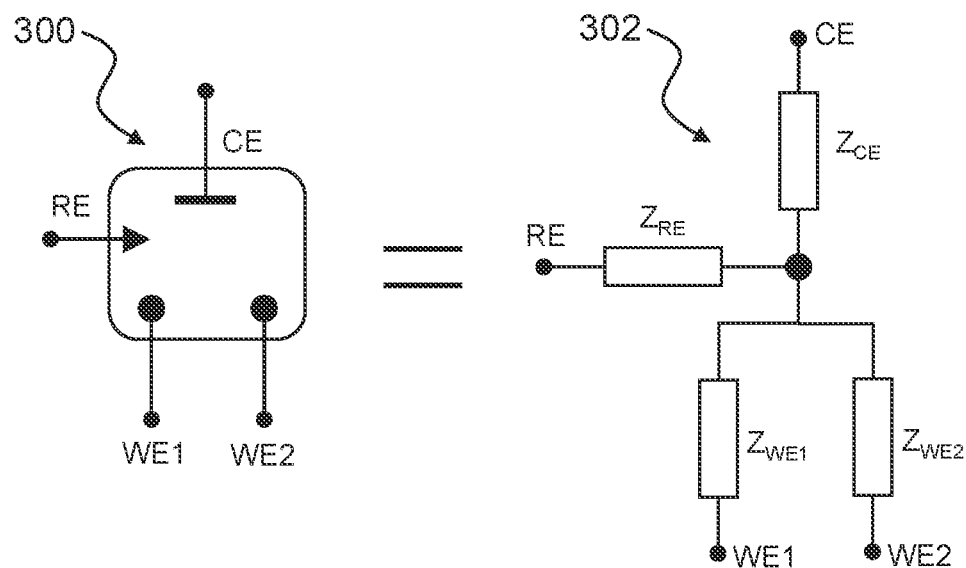
FIG. 3 illustrates a schematic diagram and electrical equivalent circuit for a four-electrode electrochemical cell.

FIG. 3 is a schematic diagram of an electrochemical cell 300 comprising four electrodes, namely a counter electrode CE, first and second working electrodes WE1, WE2 and a reference electrode RE. FIG. 3 also shows an equivalent circuit 302 for the electrochemical cell 300 comprising a counter electrode impedance ZCE, first and second working electrode impedances ZWE1, ZWE2 and a reference electrode impedance ZRE.

Figure 4:
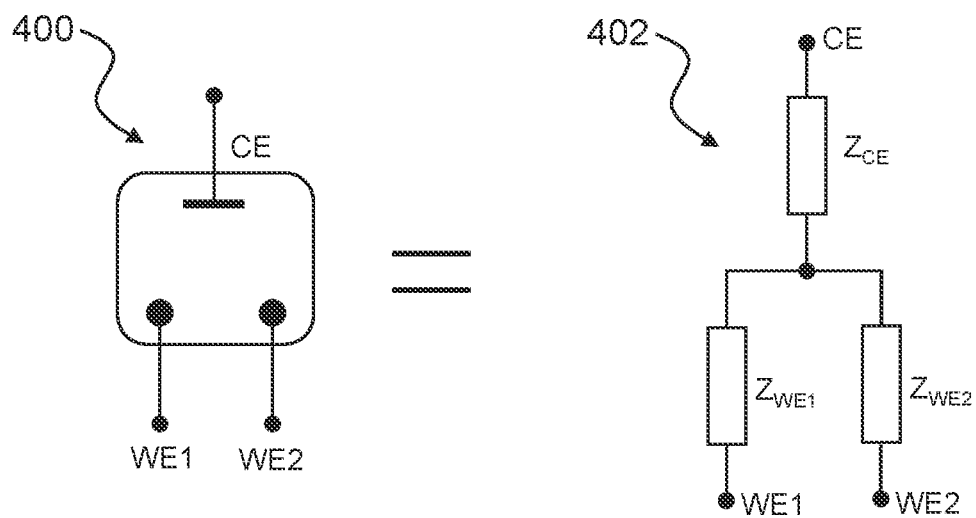
FIG. 4 illustrates a schematic diagram and electrical equivalent circuit for a three-electrode electrochemical cell.

FIG. 4 is a schematic diagram of an electrochemical cell 400 comprising three electrodes, namely a counter electrode CE and first and second working electrodes WE1, WE2. The electrochemical cell 400 varies for the cell 300 with the omission of the reference electrode RE. FIG. 2 also shows an equivalent circuit 402 for the electrochemical cell 400 comprising a counter electrode impedance ZCE and first and second working electrode impedances ZWE1, ZWE2.

In some embodiments, the first and second working electrodes WE1, WE2 each comprise an assay or chemical of interest. For example for the analysis of glucose as an analyte, one or both of the working electrodes WE1, WE2 may comprise a layer of glucose oxidase. The counter electrode CE is provided to form an electrical or ohmic connection with the working electrodes WE1, WE2. Optionally, the reference electrode is provided, which is typically a sensing point between the working electrode WE and the counter electrode CE, allowing independent measurement of the potential associated with each of the working and counter electrodes WE1, WE2, CE, rather than just measuring a potential difference between the counter electrode CE and respective working electrodes WE1, WE2.

Embodiments of the disclosure will be described with reference to these example electrochemical cells 100, 200, 300, 400. It will be appreciated, however, that the techniques and apparatus described herein may be used in conjunction with any conceivable electrochemical system, including but not limited to electrochemical cells comprising at least two electrodes (e.g. a counter electrode CE, a working electrode WE and optionally a reference electrode RE), or electrochemical cells with more than three electrodes (e.g. two or more counter electrodes and/or two or more working electrodes). Electrodes of the electrochemical cells described herein may also be referred to as anodes and/or cathodes as is conventional in the field of electrical batteries.

To determine a characteristic of any of the electrochemical cells 100, 200, 300, 400, and therefore an analyte concentration, it is conventional to apply a bias voltage at the counter electrode CE and measure a current at the working electrode WE. When provided, the reference electrode RE may be used to measure a voltage drop between the working electrode WE and the reference electrode RE. The bias voltage is then adjusted to maintain the voltage drop between the reference and working electrodes RE, WE constant. As the resistance in the cell 100 increases, the current measured at the working electrode WE decreases. Likewise, as the resistance in the cell 100 decreases, the current measured at the working electrode WE increases. Thus the electrochemical cell 100 reaches a state of equilibrium where the voltage drop between the reference electrode RE and the working electrode WE is maintained constant. Since the bias voltage at the counter electrode CE and the measured current at WE are known, the resistance of the cell 100 can be ascertained.

Figure 5:
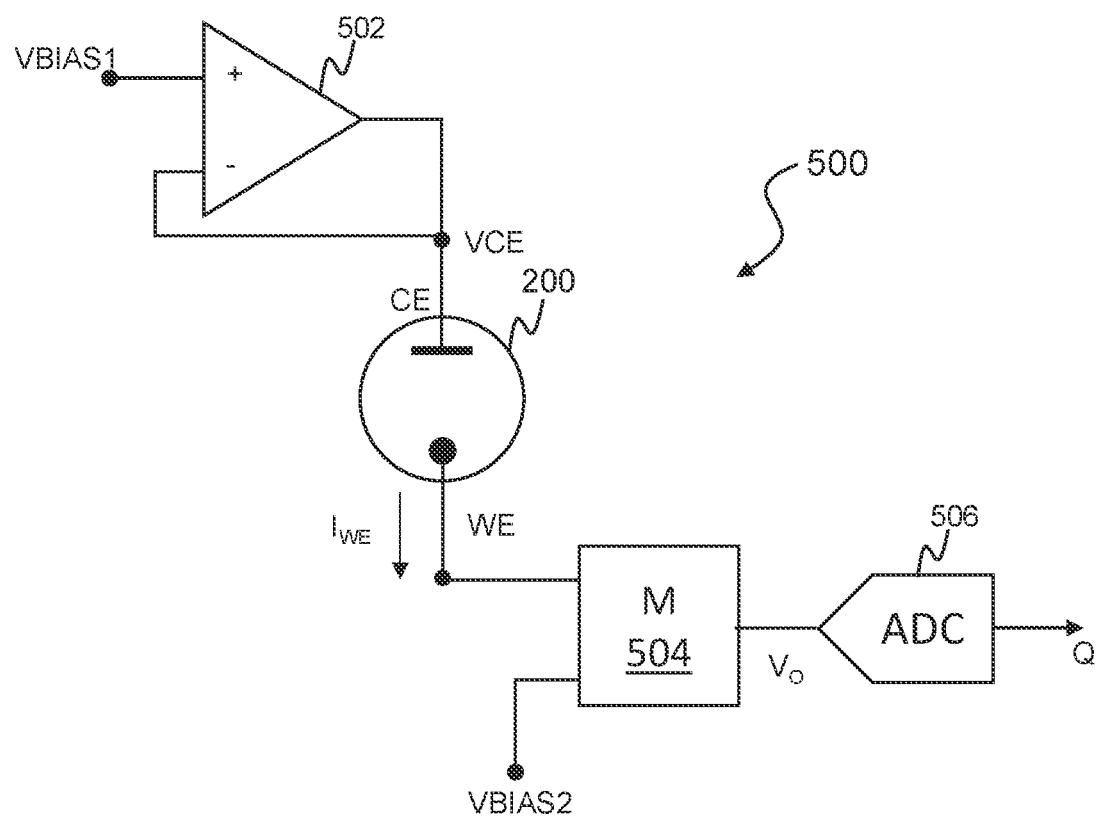
FIG. 5 is a schematic diagram of an example prior art measurement circuit.

FIG. 5 illustrates an example prior art drive and measurement circuit 500 which is configured to implement the above explained cell characterisation, specifically for measuring an analyte concentration in the electrochemical cell 200 shown in FIG. 2. The circuit 500 comprises a first amplifier 502 and a measurement circuit 504. Each of the first amplifier 502 and the measurement circuit 504 may comprise one or more op-amps. A non-inverting input of the first amplifier 502 is coupled to a bias voltage VBIAS which may be generated by a digital-to-analog converter DAC (not shown). An inverting input of the first amplifier 502 is coupled to the counter electrode CE. An output of the first amplifier 502 is coupled to the counter electrode CE and configured to drive the counter electrode CE with a counter electrode bias voltage VCE. The counter electrode bias voltage VCE applied at the counter electrode CE by the first amplifier 502 is proportional to the difference between the bias voltage VBIAS1 and the voltage at the counter electrode CE.

The measurement circuit 504 is coupled between the working electrode WE and an analog-to-digital converter (ADC) 506. The measurement circuit 504 is operable to output to the ADC 506 a signal proportional to the current flowing from the working electrode WE. The ADC 506 then converts the signal output from the measurement circuit 304 to a digital output signal Q which represents the current flowing from the working electrode WE.

The measurement circuit 504 typically implemented as a transimpedance amplifier or a current conveyor.

The drive and measurement circuit 500 described above may be used to implement electro-impedance spectroscopy (EIS) on the cell 200.

To implement EIS, it is conventional to modulate the bias voltage VBIAS1, for example by applying a sine wave having a modulated frequency and/or amplitude. The measurement circuit 304 and ADC 306 may then be used to measure a response of the cell 200 to that sine wave, in the form of the output voltage VO. The frequency of the sine wave may be adjusted over a range of frequencies in order to obtain a series of frequency dependent impedance measurements of the cell 200.

An alternative approach to the above EIS technique is chronoamperometry (CA) in which a step or impulse function stimulus is applied to the cell 200. A transfer function between the stimulus and a response of the cell 200 to that stimulus can then be estimated or inferred.

In the above conventional approaches, the stimulus is applied at the counter electrode CE. However, in embodiments of the present disclosure, instead of interrogating the counter electrode CE to illicit a characterising response, various stimuli are applied via the working electrode WE, for example by modulating a signal applied at the working electrode WE instead. This technique of stimulating the working electrode has advantages, particularly when characterising cells having multiple working electrodes, such as the cells 300, 400 shown in FIGS. 3 and 4.

Figure 6:
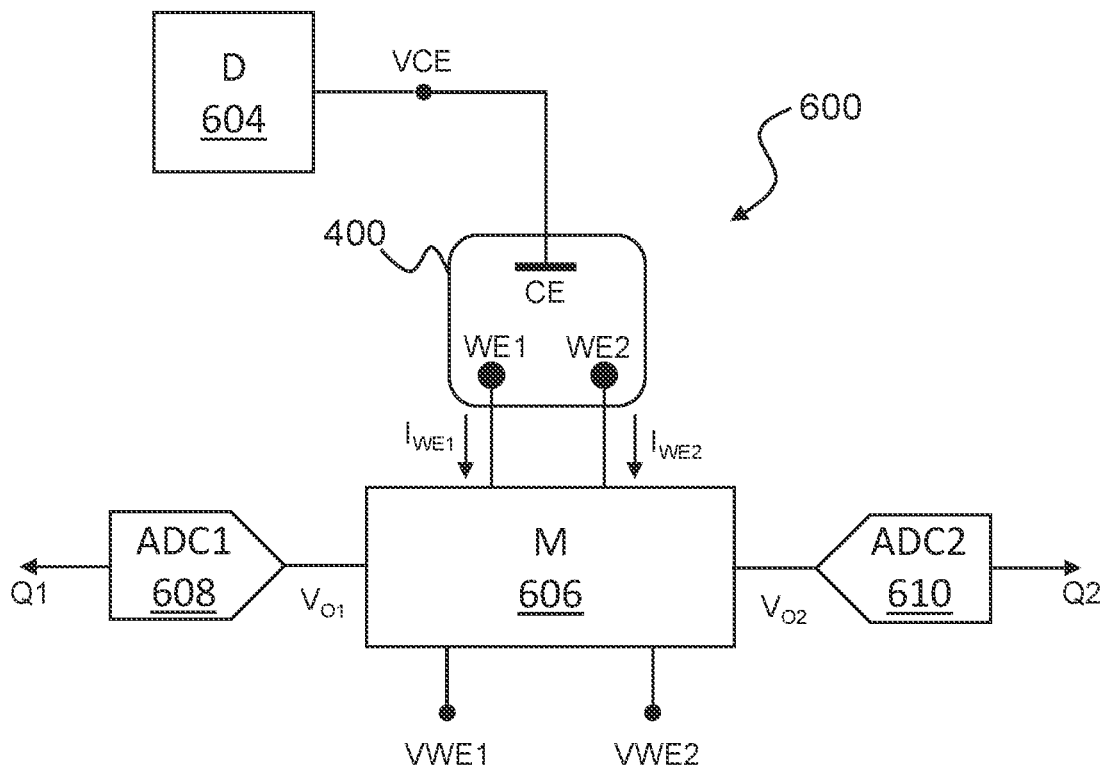
FIG. 6 is a schematic diagram of a measurement circuit for measuring characteristics of an electrochemical cell.

FIG. 6 illustrates an example drive and measurement circuit 600 for characterising the multi-working-electrode cell 400 shown in FIG. 4. A counter electrode bias voltage VCE is applied by a drive circuit 604 coupled to the counter electrode CE. The drive circuit 604 may comprise, for example, the first amplifier 502 configured in a similar manner to that shown in FIG. 3. Alternatively, the counter electrode may be coupled directly to a reference voltage (such as ground GND). A measurement circuit 606 is coupled between the first working electrode WE1 and a first ADC 608 and between the second working electrode WE2 and a second ADC 610. The measurement circuit 606 is configured to convert a first current IWE1 at the first working electrode WE1 to a first voltage VO1 provided to the first ADC 610. The measurement circuit 606 is further configured to convert a second current at the second working electrode WE2 to a second voltage VO2 which is provided to the second ADC 610. The measurement circuit 606 may comprise one or more transimpedance amplifiers or current conveyors to perform such conversion. The first and second ADCs 608, 610 are configured to convert respective first and second voltages VO1, VO2 into first and second digital representations Q1, Q2 representing respective first and second currents IWE1, IWE2 at respective first and second working electrode WE1, WE2. As will be described in more detail below, the measurement circuit 606 is also capable of driving the first and/or second working electrodes WE1, WE2 with one or more stimuli.

In the arrangement shown in FIG. 6, the presence of two working electrodes WE1, WE2 enables a different stimulus to be applied to each of the working electrodes WE1, WE2. This may be advantageous where each of the working electrodes WE1, WE2 is configured to characterize a different analyte. In which case, it may be beneficial to interrogate the cell 400 via the first working electrode WE1 with a stimulus having different properties (e.g. amplitude and/or frequency properties) to a stimulus used to interrogate the cell 400 via the second working electrode WE2. Additionally or alternatively, where the first and second working electrodes WE1, WE2 are configured to characterise the same analyte, different stimuli may be applied at the first and second working electrodes WE1, WE2 to obtain information pertaining to different characteristics associated with the cell 400 (and analytes therein). Thus a more efficient (faster and/or more detailed) characterisation of the cell 400 may be obtained.

The provision of multiple working electrodes with different characteristics may be realised in a variety of different ways. For example, each working electrode WE1, WE2 may be formed on a single substrate (e.g., needle). Multiple different depositions provided on the substrate may form the two separate working electrodes WE1, WE2. The conductor (e.g. metal of the substrate (e.g. needle)) may then form the CE. A common choice for this metal substrate is platinum or silver/silver chloride. In another example, a single substrate (e.g. needle) may be provided with two different layers of depositions at separate points along the substrate, each of the layers forming a working electrode.

Referring again to the equivalent circuits 302, 402 shown in FIG. 4, it will be understood that respective counter electrode and reference electrode impedances ZCE, ZRE may be present in the cells 300, 400. For example, referring to the cell 300 in FIG. 3, with a finite impedance between the reference electrode RE and the counter electrode, the cell 300 will exhibit crosstalk due to current leakage between the first and second working electrode WE1, WE2. For example, if a stimulus is applied to the first working electrode WE1, the second working electrode WE2 will also be affected.

Figure 7:
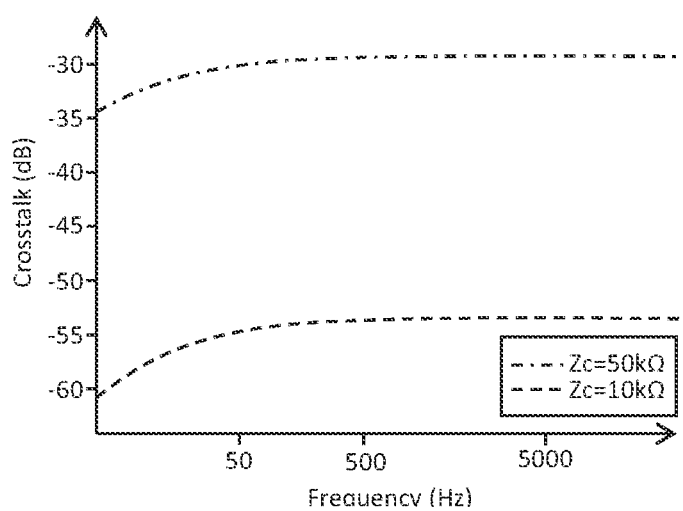
FIG. 7 is a graph showing crosstalk between working electrodes of the electrochemical cell of FIG. 3.

FIG. 7 is a graph showing crosstalk in dB between the first and second working electrodes WE1, WE2 of the cell 300 over a range of frequencies for different values of counter electrode impedance ZCE. It can be seen that as the counter electrode impedance ZCE increased from 10 k$\Omega$ to 50 k$\Omega$, the level of crosstalk increases considerably.

Figure 8:
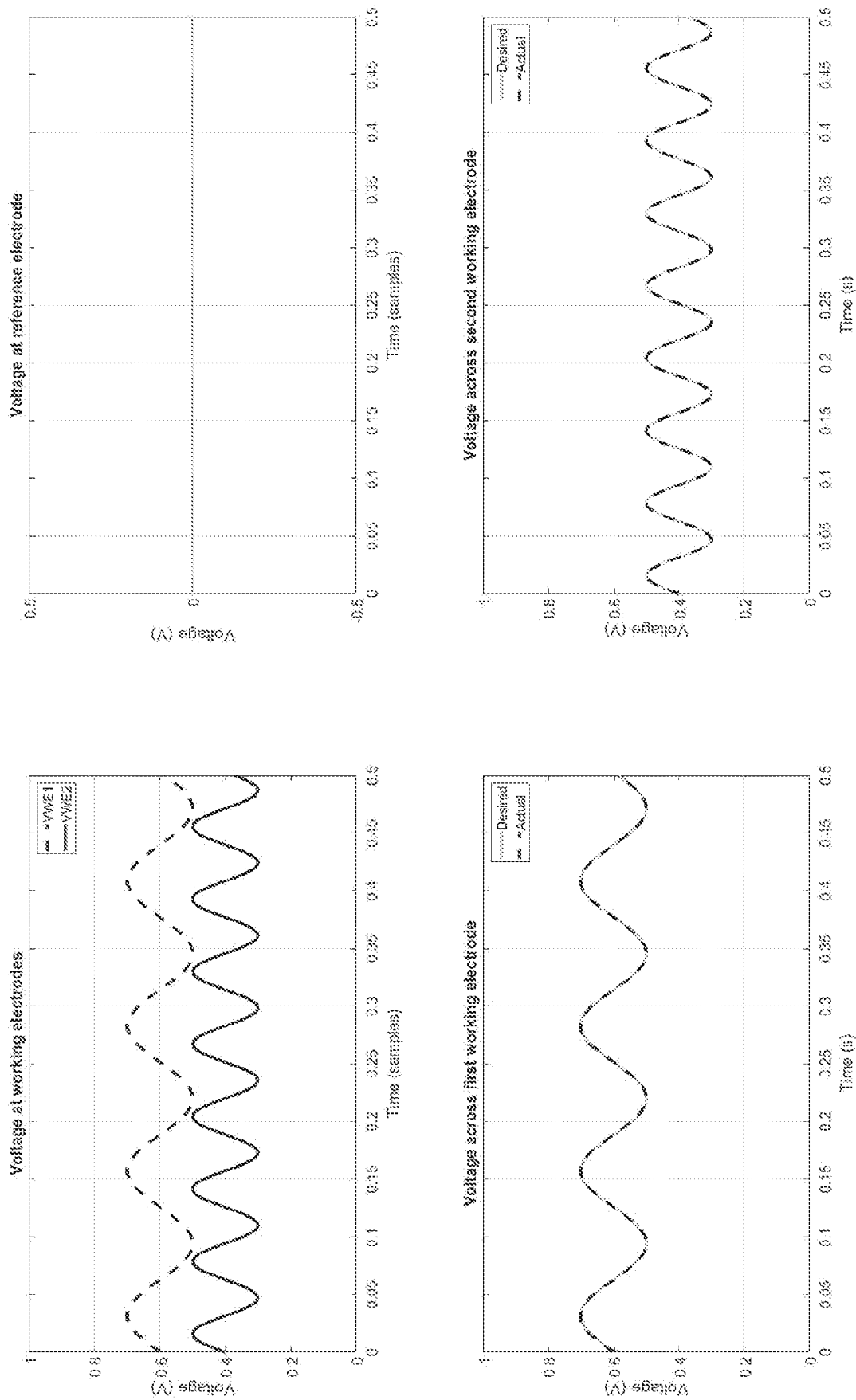
FIG. 8 graphically illustrates applied and measured voltages at the electrochemical cell of FIG. 3.
Figure 9:
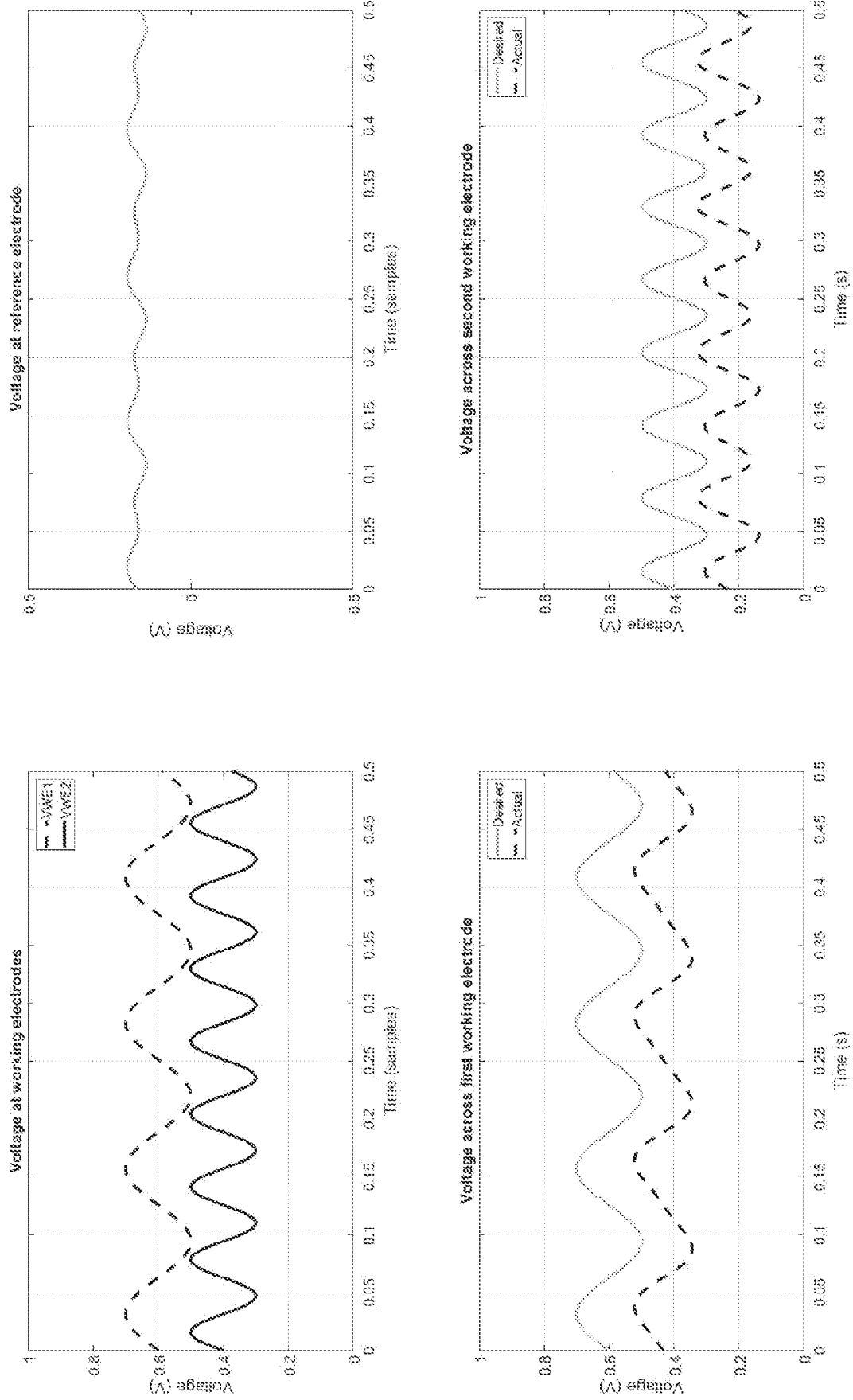
FIG. 9 graphically illustrates applied and measured voltages at the electrochemical cell of FIG. 3.

The effect of crosstalk between the first and second working electrodes WE1, WE2 can be observed by monitoring a voltage drop between the reference electrode RE and respective the first and second working electrodes WE1, WE2 responsive to applied voltage stimuli. FIGS. 8 and 9 graphically illustrate applied and measured voltages at the reference electrode RE, first working electrode WE1, and second working electrode WE2 for different values of counter electrode impedance ZCE.

FIG. 8 contains four graphical plots for applied and measured voltages at the cell 300 of FIG. 3. In this example the counter electrode CE has a counter electrode impedance ZCE of 0 (zero) $\Omega$ and first and second working electrodes WE1, WE2 have respective first and second working electrode impedances ZWE1, ZWE2 of 100 k$\Omega$.

The top left plot of FIG. 8 illustrates first and second working electrode voltage VWE1, VWE2 applied to the first and second working electrodes WE1, WE2 of the cell 300 relative to ground (GND). The top right plot of FIG. 8 illustrates a voltage VRE at the reference electrode RE relative to ground (GND). The bottom left plot of FIG. 8 illustrates a first measured voltage between the reference electrode RE and the first working electrode WE1 of the cell 300. The bottom right plot of FIG. 8 illustrates a second measured voltage between the reference electrode RE and the second working electrode WE2 of the cell 300.

It can be seen that the reference voltage VRE at the reference electrode RE is constant and held at zero volts—an ideal condition. In addition, first and second measured voltages between the reference electrode RE and respective first and second working electrode WE1, WE2 substantially match the voltages VWE1, VWE2 applied at respective first and second working electrodes WE1, WE2.

FIG. 9 graphically illustrates an equivalent four plots to those shown in FIG. 8. In this example the counter electrode CE has a counter electrode impedance ZCE of 10 k$\Omega$ (instead of zero $\Omega$ as is the case for FIG. 8). Like the example in FIG. 8, the first and second working electrodes WE1, WE2 have respective first and second working electrode impedances ZWE1, ZWE2 of 100 k$\Omega$.

The top left plot of FIG. 9 illustrates first and second working electrode voltage VWE1, VWE2 applied to the first and second working electrodes WE1, WE2 of the cell 300 relative to ground (GND). The top right plot of FIG. 9 illustrates a voltage VRE at the reference electrode RE relative to ground (GND). The bottom left plot of FIG. 9 illustrates a first measured voltage between the reference electrode RE and the first working electrode WE1 of the cell 300. The bottom right plot of FIG. 9 illustrates a second measured voltage between the reference electrode RE and the second working electrode WE2 of the cell 300.

It can be seen that the voltages VWE1, VWE2 applied to the first and second working electrodes WE1, WE2 are the same as the voltages applied in the example shown in FIG. 8. Comparing the reference voltage VRE with that of FIG. 8, it can be seen to vary substantially over time. In addition, first and second measured voltages between the reference electrode RE and respective first and second working electrode WE1, WE2 no longer match the voltages VWE1, VWE2 applied at respective first and second working electrodes WE1, WE2. Instead, the first and second measured voltages across the first and second working electrode WE1, WE2 are shifted in amplitude with respect to the desired voltages.

Embodiments of the present disclosure aim to address or at least ameliorate one or more of the above issues by injecting a compensation stimulus C at one or more electrodes of an electrochemical cell, such as the cells 300, 400 described above, so as to compensate for crosstalk between electrodes, such as the first and second working electrodes WE1, WE2.

The compensation stimulus C can be ascertained with knowledge of impedances of the various electrodes of a cell. For example, with reference again to the equivalent circuit 302 shown in FIG. 3, with knowledge of the first and second working electrode impedances ZWE1, ZWE2 and the counter electrode impedance ZCE, a compensation stimulus C can be determined for injection at one of the counter electrode CE, the first working electrode WE1, the second working electrode WE2, or a combination of such electrodes CE, WE1, WE2.

Figure 10:
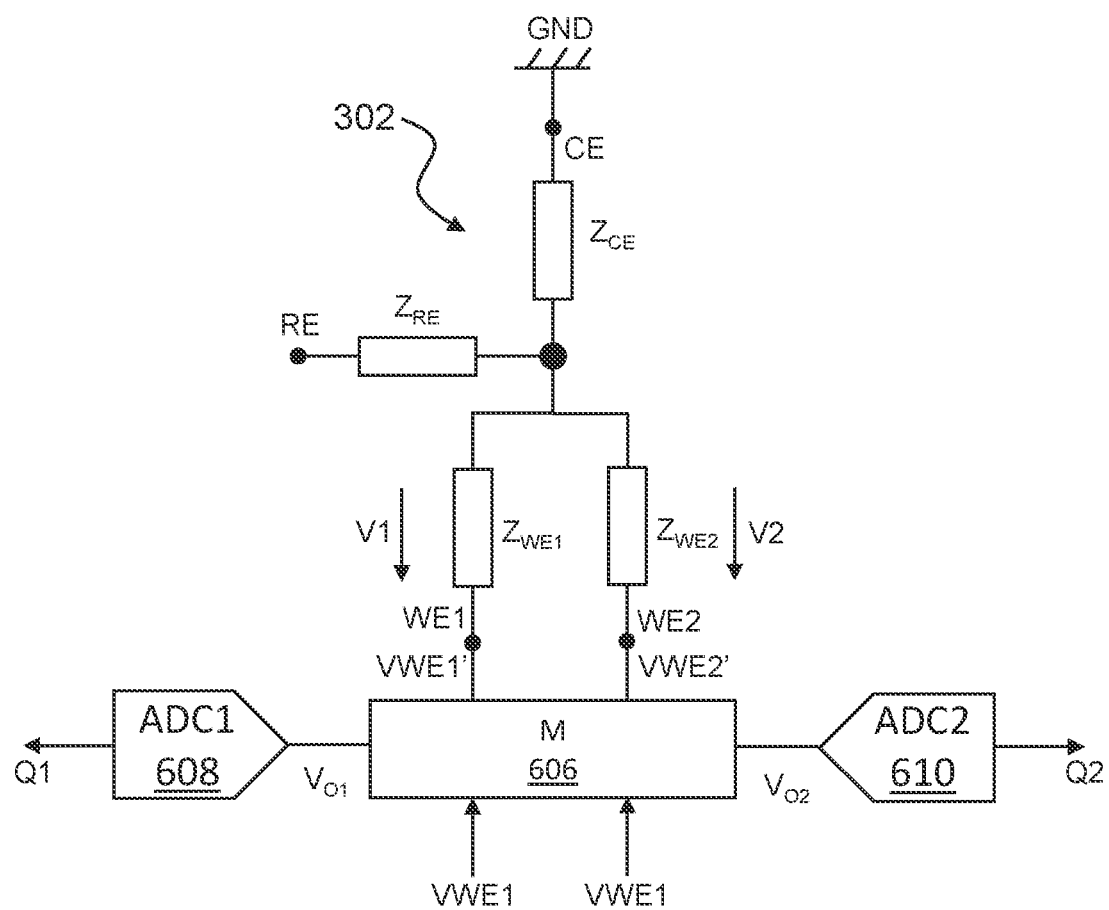
FIG. 10 is an illustrative variation of the diagram of FIG. 6, the electrochemical cell having been replaced with its circuit equivalent.

FIG. 10 is a schematic diagram showing the example circuit 600 of FIG. 6, the cell 300 substituted by its equivalent circuit 302 and the counter electrode coupled to ground (zero volts). As noted above, the measurement circuit 606 is capable of applying first and second compensated voltage VWE1', VWE2' to the first and second working electrodes WE1, WE2. The measurement circuit 606 may combine the compensation stimulus C with one or both of the first and second working electrode voltages VWE1, VWE2 provided to the measurement circuit 606. For example, the compensation stimulus may be combined into the second compensated voltage VWE2' only, the first compensated voltage VWE1' being unchanged relative to the first working electrode voltage VWE1 provided to the measurement circuit 606. Alternatively, the compensation stimulus C may be combined into the first compensated voltage VWE1' only, the second compensated voltage VWE2' being unchanged relative to the second working electrode voltage VWE2 provided to the measurement circuit 606. Alternatively, the compensation stimulus C may be combined into the first and second compensated voltages VWE1', VWE2'. Additionally or alternatively, although not shown in FIG. 10, the compensation stimulus C or a component therefore may be applied at the counter electrode CE.

The measurement circuit 606 may adapt the first and second (desired) voltages VWE1, VWE2 such that the voltages VWE1', VWE2' applied at the first and second working electrodes WE1, WE2 lead to the voltage drop between the reference electrode RE and each of the working electrodes WE1, WE2 substantially matching the first and second (desired) voltages VWE1, VWE2. In doing so, crosstalk between the first and second working electrodes WE1, WE2 may be compensated for.

The relationship between the desired first and second voltages VWE1, VWE2 provided to the measurement circuit 606 and the first and second compensated voltages VWE1', VWE2' applied to the first and second working electrodes WE1 may be defined by the following two equations.

$$V'_{WE1} = K_1 \cdot V_{WE1} + \beta \cdot V_{WE2}$$

$$V'_{WE2} = K_2 \cdot V_{WE2} + \alpha \cdot V_{WE1}$$

Where:

$$K_1 = \frac{Z_{WE1} + Z_{CE}}{Z_{WE1}} \quad \beta = \frac{Z_{CE}}{Z_{WE2}}$$

$$K_2 = \frac{Z_{WE2} + Z_{CE}}{Z_{CE}} \quad \alpha = \frac{Z_{CE}}{Z_{WE1}}$$

The measurement circuit 606 may calculate VWE1' and VWE2' based on the received first and second voltages VWE1, VWE2 using the above equations. It will be appreciated, however, that solving the above equations relies on knowledge of the first and second working electrode impedances ZWE1, ZWE2 and the counter electrode impedance ZCE. Such impedances may be determined using various techniques, as will be discussed in more detail below.

Figure 11:
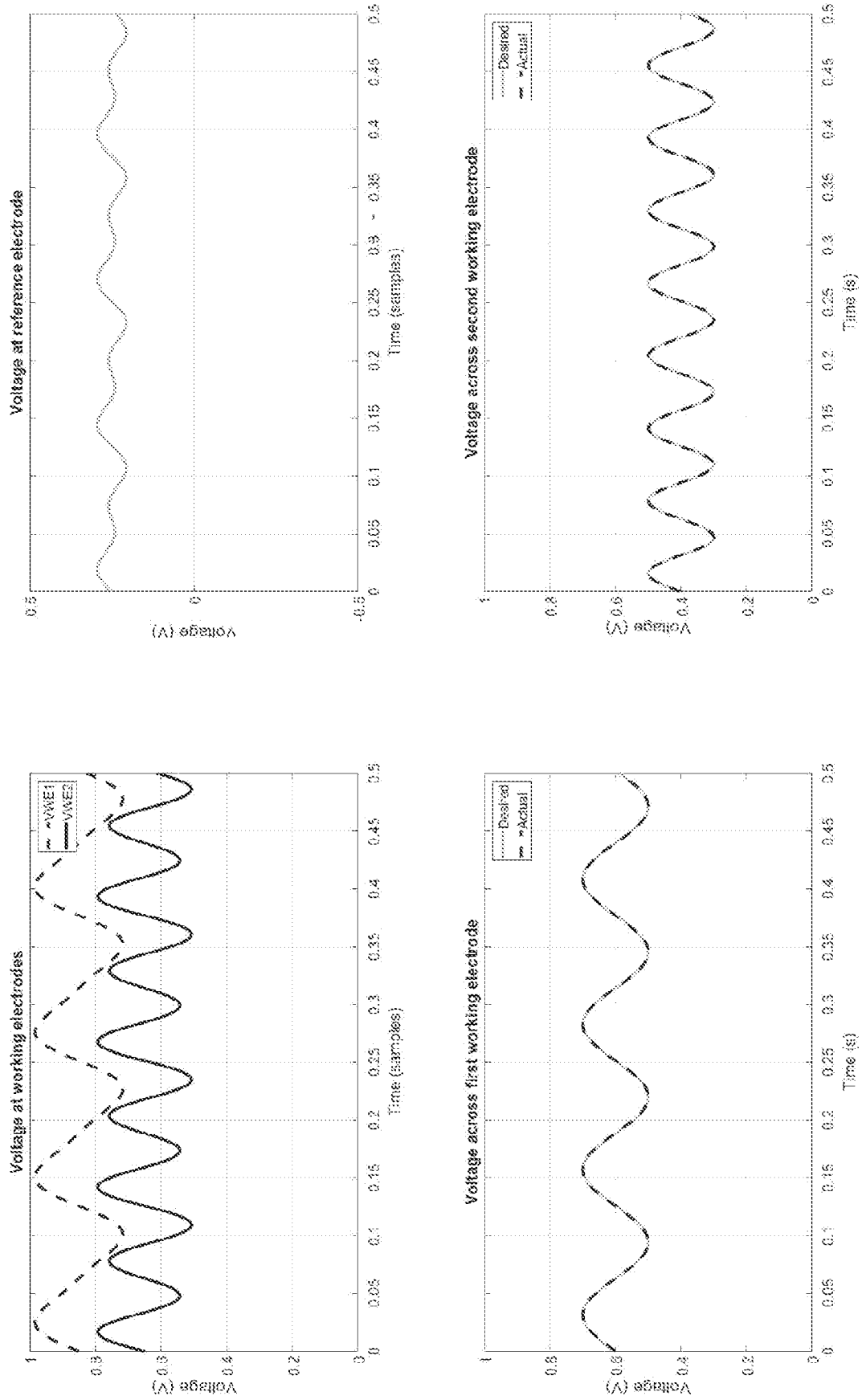
FIG. 11 graphically illustrates applied and measured voltages at the electrochemical cell of FIG. 3.

FIG. 11 graphically illustrates measured voltages VWE1, VWE2 at the first and second working electrodes WE1, WE2 for the cell 300 having a counter electrode impedance ZCE of 10 kΩ and first and second working electrode impedances ZWE1, ZWE2 of 100 kΩ. In this example, the first and second voltages VWE1, VWE2 applied at the first and second working electrode WE1, WE2 each comprise a compensation component (i.e. the compensation stimulus), which compensates for crosstalk between the first and second working electrodes WE1, WE2.

The top left plot of FIG. 11 illustrates first and second working electrode voltage VWE1', VWE2' applied to the first and second working electrodes WE1, WE2 of the cell 300 relative to ground (GND). The top right plot of FIG. 11 illustrates a voltage VRE at the reference electrode RE relative to ground (GND). The bottom left plot of FIG. 11 illustrates a first measured voltage between the reference electrode RE and the first working electrode WE1 of the cell 300. The bottom right plot of FIG. 11 illustrates a second measured voltage between the reference electrode RE and the second working electrode WE2 of the cell 300.

It can be seen from the top left plot of FIG. 11 that the voltage VWE1' VWE2' applied at respective first and second working electrodes WE1, WE2 appear distorted due to the presence of a compensation component in each. However, this compensation component acts to compensate for crosstalk between the working electrodes WE1, WE2, such that the first and second measured voltages (shown in the bottom left and right plots of FIG. 11) between respective first and second working electrode WE1, WE2 and the reference electrode RE match the first and second (desired) voltages VWE1, VWE2 provided to the measurement circuit 606. It is also noted that, like the reference voltage VRE in the example in FIG. 9, the reference voltage VRE is uncontrolled, it being set by the voltage VCE at the counter electrode CE and the first and second voltages VWE1', VWE2' at the working electrode WE1, WE2 as well as respective impedances of the electrodes CE, WE1, WE2.

As mentioned above, based on first and second desired voltages VWE1, VWE2, the first and second applied voltage VWE1', VWE2' can be derived with knowledge of respective impedances ZWE1, ZWE2, ZCE. In some embodiments, such impedances ZWE1, ZWE2, ZCE may be measured or estimated. In some embodiments, a combination of estimation and measurement may be used to derive one or more of the respective impedances ZWE1, ZWE2, ZCE. It will be appreciated that the reference electrode RE may in some embodiments be omitted (as shown in FIG. 4) and/or the reference electrode voltage VRE may not be available to measure. The below example techniques consider scenarios in which the reference electrode VRE is both available and unavailable for test.

Figure 12:
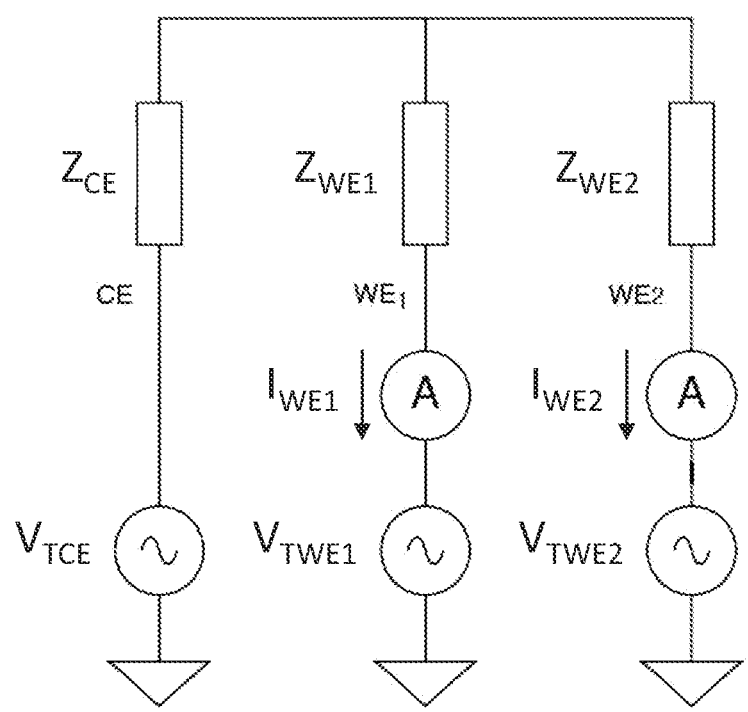
FIG. 12 is a circuit model of the electrochemical cell of FIG. 3 in a process of calibration.

FIG. 12 illustrates an equivalent circuit 1200 of an example test arrangement for estimation of one or more of the counter electrode impedance ZCE, the first working electrode impedance ZWE1 and the second working electrode impedance ZWE2.

A constant bias voltage in this case ground (GND) may be applied at each of the counter, first and second working electrodes CE, WE1, WE2. A test stimulus may then be applied at one or more of the counter and working electrodes CE, WE1, WE2. In FIG. 12, these respective test stimuli are denoted VTCE, VTWE1 and VTWE2 respectively. It will be appreciated that a test stimulus may be applied at one of the counter, first and second working electrodes CE, WE1, WE2 or alternatively at two or more of the counter, first and second working electrodes CE, WE1, WE2. The test stimuli VTCE, VTWE1, VTWE2 may comprise a step signal, impulse signal, an AC signal or a combination thereof.

First and second working electrode currents IWE1, IWE2 may be measured, for example using the measurement circuit 606 shown in FIG. 6. Such currents may, for example, be induced by each of the respective stimuli VTCE, VTWE1, VTWE2. As such, up to six current measurements are available for the three impedances ZCE, ZWE1, ZWE2 to be estimated are referred to below as IC1, IC2, I11, I12, I21, I22.

| Stimulus | Measurement at IWE1 | Measurement at IWE2 |
| --- | --- | --- |
| VTCE | IC1 | IC2 |
| VTWE1 | IW11 | IW12 |
| VTWE2 | IW21 | IW22 |

Thus, the equivalent circuit 1200 can be described by the following three sets of equations.

When a non-zero stimulus VTCE is applied at the counter electrode CE, VTWE1=VTWE2=0, and DCE is the voltage divider between ZCE and the parallel combination of ZWE1 and ZWE2:

$$I_{C1} = -\frac{V_{CE}}{Z_{WE1}} D_{CE}$$

$$I_{C2} = -\frac{V_{CE}}{Z_{WE2}} D_{CE}$$

When VTCE=VTWE2=0 and DWE1 is the voltage divider between ZWE1 and the parallel combination of ZCE and ZWE2:

$$I_{W11} = \frac{V_{WE1}}{Z_{WE1}}(1 - D_{WE1})$$

$$I_{W12} = -\frac{V_{WE1}}{Z_{WE2}} D_{WE1}$$

And when VTCE=VTWE1=0 and DWE2 is the voltage divider between ZWE2 and the parallel combination of ZCE and ZWE1:

$$I_{W21} = -\frac{V_{WE2}}{Z_{WE1}} D_{WE2}$$

$$I_{W22} = \frac{V_{WE1}}{Z_{WE1}}(1 - D_{WE1})$$

In some embodiments, an analytical approach may be taken to estimate the counter electrode impedance ZCE. Such an approach may comprise rewriting the above equations as one or more linear systems.

For example, the equations for IC1, IC2, IW11 and IW12 may be rearranged as four constraints on ZCE only:

$$Z_{CE} = \frac{I_{W12} Z_{WE1} Z_{WE2}}{V_{WE1} + I_{W12}(Z_{WE1} + Z_{WE2})}$$

$$Z_{CE} = \frac{I_{W21} Z_{WE1} Z_{WE2}}{V_{WE2} + I_{W21}(Z_{WE1} + Z_{WE2})}$$

$$Z_{CE} = \frac{I_{C1} Z_{WE1} Z_{WE2} + V_{CE} Z_{WE2}}{I_{C1}(Z_{WE1} + Z_{WE2})}$$

$$Z_{CE} = \frac{I_{C2} Z_{WE1} Z_{WE2} + V_{CE} Z_{WE1}}{I_{C2}(Z_{WE1} + Z_{WE2})}$$

And the final two equations above for IW21 and IW22 can be rewriting as a linear system in ZWE1 and ZWE2:

$$V_{WE1} = I_{W11} Z_{WE1} - I_{W12} Z_{WE2}$$

$$V_{WE2} = I_{W21} Z_{WE1} - I_{W22} Z_{WE2}$$

In an improvement of the analytical approach described above, an additional equation can be added to the described linear system, as defined below:

$$0 = I_{C1} Z_{WE1} - I_{C2} Z_{WE2}$$

Including the above equation in the analytical model may reduce the estimation error associated with ZWE1 and ZWE2 which propagates to ZCE.

Other analytical approaches may be taken which are within the remit of the skilled person. In some embodiments, one or more calculations associated with such estimations may be precomputed and placed in a look up table.

In some embodiments, a numerical approach may be taken to obtain the various impedances. For example, the circuit 1200 may be described as a set of non-linear equations where a certain error on the sensed currents is considered. These non-linear equations may then be solved to minimize such error.

Where multiple measurements are made with respect to multiple electrodes, iterative optimization methods may be implemented to obtain more accurate and/or precise estimates of the counter electrode impedance ZCE.

Figure 13:
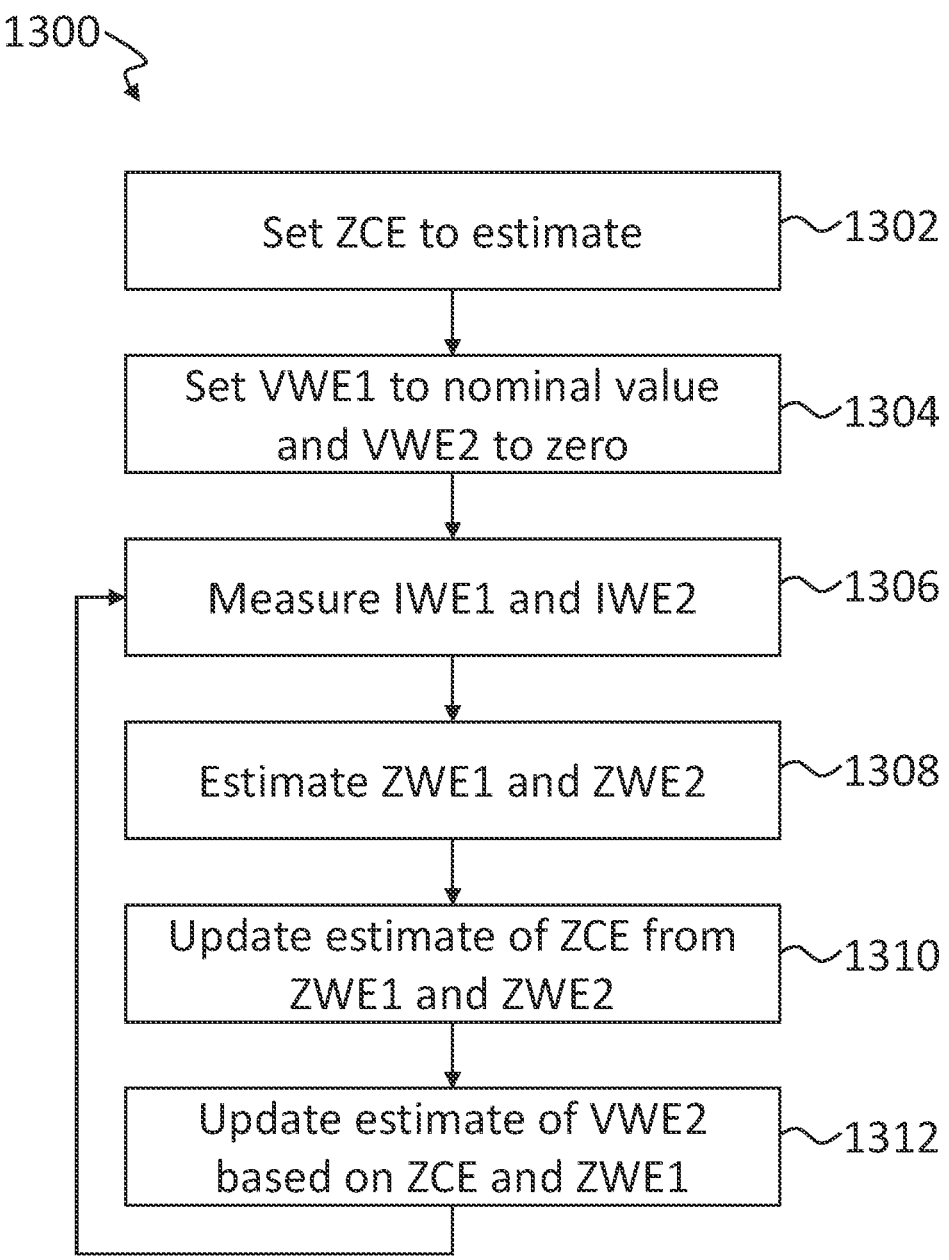
FIG. 13 is a process flow for an optimisation method for obtaining impedances of the electrochemical cell of FIG. 3.

FIG. 13 illustrates an example process 1300 for optimising initial estimates of ZCE, ZWE1 and ZWE2. At step 1302, an initial estimate for ZCE is obtained. At step 1304, VWE1 is set to a nominal value and VWE2 is set to zero. With these conditions in place, at step 1306, the first and second working electrode currents IWE1, IWE2 are measured. Based on these measurements, at step 1308, an estimate of ZWE1 and ZWE2 is obtained by solving a non-linear system, which may be defined by the following equations.

$$\varepsilon_{WE1} = \frac{V_{WE1}}{Z_{WE1}}(1 - D_{WE1}) - \frac{V_{WE2}}{Z_{WE1}}(D_{WE2} - I_{WE1})$$

-continued $$\varepsilon_{WE2} = \frac{V_{WE2}}{Z_{WE2}}(1 - D_{WE2}) - \frac{V_{WE1}}{Z_{WE2}}(D_{WE1} - I_{WE2})$$

At step 1310, the initial estimate of ZCE may be updated based on the estimates of ZWE1 and ZWE2 obtained at step 1306.

At step 1312, an updated value for VWE2 may be obtained based on the estimates of ZCE and ZWE1.

The process may then return to step 1306, where this step and steps 1308, 1310 and 1312 are repeated to iteratively optimise the estimates of ZCE, ZWE1 and ZWE2.

In another example, a least mean squared (LMS) estimate of ZCE, ZWE1 and ZWE2 may be obtained by defining a linear system. However, such an approach may be less accurate since non-linear relationships between equations in such linear systems are not considered.

In another example, an inverse (such as a pseudoinverse) of the first and second working electrode impedances ZWE1, ZWE2 may be performed to estimate the counter electrode impedance ZCE.

As noted above, in some embodiments, the reference electrode RE may be provided and available for test. In such situations, various options are available for estimation of impedances ZCE, ZWE1, ZWE2 of the cell 300.

In one example, a LMS estimation may be obtained based on the difference between a reference electrode voltage VRE and a voltage VWE2 at the second working electrode, without the need to measure the first and second working electrode currents IWE1, IWE2. However, a measurement of the first working electrode current IWE1 at convergence is required to obtain all of ZCE, ZWE1 and ZWE2.

In another example, a LMS estimation may be obtained based on the difference between a reference electrode voltage VRE and a voltage VWE2 at the second working electrode, and the second working electrode current IWE2.

In another example, if the reference electrode voltage VRE and first and second working electrode currents IWE1, IWE2 are observed over a sufficient time period to reduce noise (increase SNR), the impedances ZCE, ZWE1, ZWE2 may be inferred such that the second working electrode voltage VWE2 can be set appropriately.

It will be appreciated that both LMS and the nonlinear approaches suffer from insensitivity towards the second working electrode impedance ZWE2 when the second working electrode voltage VWE2 is set to reduce the second working electrode current IWE2. This is due to the transfer function at not being dependent on the second working electrode impedance ZWE2. As such, data required to estimate ZWE2 must be obtained whilst the various systems are converging.

In some embodiments, to provide sufficient time to obtain such data, convergence may be slowed down by using a suitable factor tending to 1. Alternatively, the second working electrode voltage VWE2 could be set randomly for the sake of the system identification.

To summarize the above example estimation techniques, each aim to estimate values for ZCE, ZWE1 and ZWE2. Sensing solutions may be categorized into two categories, variable amplitude and variable input. In the first, multiple measurements may be obtained over time by sensing the same variable while changing one of the applied stimuli. For example an LMS filter may be applied to measurements of the first or second working electrode currents IWE1, IWE2. In the second category, multiple measurements may be obtained by changing the input to which a stimulus is applied, e.g. measuring all of the currents IC1, IC2, IW11, IW12, IW21, IW22.

Mathematical modelling may be categorized as linear or non-linear. In the linear category, a linear subset of the problem may be considered, or a linearization may be performed. For example, IW11, IW12, IW21, IW22 may be used to estimate ZWE1 and ZWE2 which can then be used to estimate ZCE.

The various adopted solutions may be categorised as analytical, i.e. an explicit formula obtained for, e.g., ZCE, ZWE1 and ZWE2, or as numerical, i.e. ZCE, ZWE1 and ZWE2 obtained through an optimization, e.g. using a LMS filter.

FIG. 14 is a table summarising various algorithmic solutions depending on knowledge of certain variables. For example, different solutions may be implemented depending on whether or not a reference electrode RE is provided (and available for measurement), and whether or not the counter electrode impedance ZCE is known or can be inferred. Where the reference electrode RE is available for measurement, different (more straightforward) methods may be used to establish the impedances ZWE1, ZWE2 of the first and second working electrodes WE1, WE2.

The examples described above aim to determine parameters of a compensation signal to be applied to various electrodes CE, WE1, WE2 of the cells 300, 400 described herein. It will be appreciated that such compensation ensures that the voltages VWE1, VWE2 at respective first and second working electrode WE1, WE2 are maintained at the desired level over time. In doing so, accurate stimulation and measurement of the various cells 300, 400 can be undertaken. Measurements in response to signals applied to the working electrodes WE1, WE2 may be used to determine one or more characteristics of the various cells.

The determined characteristics may comprise, for example, a resistance or impedance of the cells 300, 400. Based on the determined characteristics, one or more properties of the device or operating parameters may be obtained. For example, an optimum bias voltage to be applied to the cell 300 during sensing of an analyte may be obtained. Additionally or alternatively, a quality of an electrolyte in the cell 300 may be ascertained. Additionally or alternatively, a fault at the electrochemical cell 300. Additionally or alternatively, circuitry may be provided to determine one or more offsets for subsequent processing. Additionally or alternatively, an equivalent circuit model (ECM) for the electrochemical cell 300 may be ascertained. Additionally or alternatively, a condition of the electrochemical cell 300 may be ascertained. Such a condition may comprise one or more of: ageing of the cell 300, a temperature (or change or temperature) at the cell, or a change in pressure at or in the cell 300.

In addition to the above, determinations of first and second working electrode and counter impedances ZWE1, ZWE2, ZCE may provide information pertaining to characteristics of the cell 300. For example, the first and second working electrode impedances ZWE1, ZWE2 may change over time, as the electrochemical cell 300 wets, ages, degrades, etc. As such, by monitoring first and second working electrode impedances ZWE1, ZWE2, a determination may be made as to a state of health of the cell 300. In another example, the counter electrode impedance ZCE may provide information pertaining to biofouling of the cell 300 or a sensor into which it is integrated. As such, a change in counter electrode impedance ZCE over time may indicate degradation (or lack of) of the cell 300 due to, for example, biofouling.

In the embodiments described herein, the electrochemical cell 100 has been described in the form of an electrochemical sensor comprising counter and working electrodes CE, WE (and optionally a reference electrode RE). For such sensors, the stimulus is typically a voltage, and the measured response is a current. It will be appreciated that embodiments of the present disclosure are not limited to such cells and extend to other types of cells, such as electrochemical cells acting as a power source (i.e. a battery) and potentiometric sensors (such as an ion selective electrolyte (ISE) sensor (e.g. a pH meter)). For batteries, potentiometric sensors and the like, the driving stimulus of the cell is typically a current, and the measured response a voltage. Embodiments described above in relation to the amperometric electrochemical cell 100 can equally be applied to cells which are driven with a current, instead of a voltage and for which voltage is the response being measured.

The various circuitry and electrochemical cells described herein may be incorporated into a continuous analyte sensor or a continuous glucose sensor or a continuous glucose monitor. The terms "continuous analyte sensor", "continuous glucose sensor", and "continuous glucose monitor" as used herein, will be well-known to a person of ordinary skill in the art and are not to be limited to a special or customized meaning. These terms refer, without limitation, to a device that continuously measures a concentration of an analyte/glucose and/or calibrates the sensor or an electrochemical cell incorporated therein (e.g., by continuously adjusting or determining the sensor's sensitivity and background).

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog TM or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

The invention claimed is:

1. Circuitry for determining one or more characteristics of an electrochemical cell comprising a first working electrode, a second working electrode and a counter electrode, the circuitry comprising:
   drive circuitry configured to:
      apply a first stimulus to the first working electrode;
      apply a compensation stimulus to one or more of the first working electrode, the second working electrode and the counter electrode;
   measurement circuitry configured to:
      measure a first signal at the first working electrode; and
      measure a second signal at the second working electrode; and
   processing circuitry configured to:
      determine the one or more characteristics of the electrochemical cell based on the first signal or the second signal,
   wherein the compensation stimulus is applied to compensate for cross talk between the first working electrode and the second working electrode.

2. Circuitry of claim 1, wherein the compensation stimulus comprises a step signal, an impulse signal, or a sine wave, or a chirp.

3. Circuitry of claim 2, wherein the compensation stimulus comprises:
   a first compensation component applied at the first working electrode; and
   a second compensation component applied at the second working electrode.

4. Circuitry of claim 1, wherein the processing circuitry is configured to:
   determine the compensation stimulus, the compensation stimulus determined in dependence on a counter electrode impedance of the counter electrode.

5. Circuitry of claim 4, wherein determining the compensation stimulus comprises:
   obtaining an estimate of the counter electrode impedance of the counter electrode; and
   determining the compensation stimulus based on the estimated counter electrode impedance.

6. Circuitry of claim 5, wherein the processing circuitry is configured to:
   determine the one or more characteristics of the electrochemical cell based on the estimate of the first counter electrode impedance.

7. Circuitry of claim 5, wherein obtaining an estimate of the counter electrode impedance comprises:
   applying a stimulus at one of the counter electrode, the first working electrode, and the second working electrode; and
   measuring a first working electrode current at the first working electrode and a second working electrode current at the second working electrode; and
   determining the counter electrode impedance based on the first and second working electrode currents.

8. Circuitry of claim 7, wherein obtaining an estimate of the counter electrode impedance further comprises:
   measuring a reference electrode voltage at a reference electrode of the electrochemical cell, wherein the counter electrode impedance is determined based on the reference electrode voltage.

9. Circuitry of claim 7, wherein the processing circuitry is configured to obtain an estimate of a first working electrode impedance of the first working electrode and an estimate of a second working electrode impedance of the second working electrode based on the measured first working electrode current and the second working electrode current.

10. Circuitry of claim 9, wherein the processing circuitry is configured to:
    determine the one or more characteristics of the electrochemical cell based on the estimate of the first working electrode impedance and/or the estimate of the second working electrode impedance.

11. Circuitry of claim 5, wherein the estimate of the counter electrode impedance is obtained using one or more of the following methods:
    a) circuit analysis to obtain or fit one or more formulae for the estimate of the counter electrode impedance;
    b) numerical optimisation;
    c) least mean squared estimation;
    d) performing an inverse of first and second working electrode impedances of the first and second working electrodes.

12. Circuitry of claim 1, wherein the processing circuitry is configured to determine, based on the one or more characteristic, one or more of the following:
    a) an optimum bias voltage to be applied to the electrochemical cell during sensing of an analyte;
    b) a quality of an electrolyte or electrode in the electrochemical cell;
    c) a fault at the electrochemical cell;
    d) a condition of the electrochemical cell;
    e) determine one or more offsets for subsequent processing;
    f) updating an equivalent circuit model (ECM) for the electrochemical cell.

13. Circuitry of claim 1, wherein the measurement circuitry is configured to:
    convert the first signal at the first working electrode to a first analog output signal; and
    convert the second signal at the first working electrode to a second analog output signal.

14. Circuitry of claim 13, wherein the measurement circuitry comprises:
    one or more analog-to-digital converters (ADCs) configured to convert the first analog output signal to a first digital output signal and convert the second analog output signal to a second digital output signal.

15. Circuitry of claim 13, wherein the measurement circuitry comprises:
    a multiplexer having:
       a first input for receiving the first analog output signal;
       a second input for receiving the second analog output signal; and
       a multiplexer output for outputting the first analog output signal or the second analog output signal in response to a select signal; and
    an analog-to-digital converter (ADC) having a first ADC input coupled to the multiplexer output, the ADC configured to convert the first analog output signal or the second analog output signal to a digital output signal.

16. Circuitry of claim 1, wherein:
the measurement circuitry is configured to measure a third signal at a reference electrode of the electrochemical cell; and
the processing circuitry is configured to determine the one or more characteristics of the electrochemical cell based on the third signal.

17. A system comprising:
the circuitry of claim 1;
the electrochemical cell.

18. The system of claim 17, wherein the electrochemical cell comprises one of an amperometric sensor and a potentiometric sensor.

19. An electronic device, comprising the circuitry of claim 1.

20. The electronic device of claim 19, wherein the electronic device comprises one of an analyte monitoring device or an analyte sensing device, a continuous glucose monitor, a battery, a battery monitoring device, a mobile computing device, a laptop computer, a tablet computer, a games console, a remote control device, a home automation controller or a domestic appliance, a toy, a robot, an audio player, a video player, or a mobile telephone, and a smartphone.

21. A method of determining one or more characteristics of an electrochemical cell comprising a first working electrode, a second working electrode and a counter electrode, the method comprising:
applying a first stimulus to the first working electrode;
applying a compensation stimulus to one or more of the first working electrode, the second working electrode and the counter electrode;
measuring a first signal at the first working electrode;
measuring a second signal at the second working electrode; and
determining the one or more characteristics of the electrochemical cell based on the first signal or the second signal,
wherein the compensation stimulus is applied to compensate for cross talk between the first working electrode and the second working electrode.

\* \* \* \* \*